United States Patent
Busick et al.

(10) Patent No.: US 12,204,797 B1
(45) Date of Patent: Jan. 21, 2025

(54) LOCK RESERVATIONS FOR SHARED STORAGE

(71) Applicant: NetApp Inc., San Jose, CA (US)

(72) Inventors: Christopher Busick, Shrewsbury, MA (US); Stephen Winslow Schmitt, Cambridge, MA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/344,948

(22) Filed: Jun. 30, 2023

(51) Int. Cl.
*G06F 3/00* (2006.01)
*G06F 3/06* (2006.01)

(52) U.S. Cl.
CPC .......... *G06F 3/0659* (2013.01); *G06F 3/0622* (2013.01); *G06F 3/0665* (2013.01); *G06F 3/0679* (2013.01)

(58) Field of Classification Search
None
See application file for complete search history.

(56) References Cited

U.S. PATENT DOCUMENTS

| | | |
|---|---|---|
| 6,751,191 B1 | 6/2004 | Kanekar et al. |
| 7,330,862 B1 | 2/2008 | Srinivasan et al. |
| 7,386,546 B1 | 6/2008 | Santry et al. |
| 7,739,546 B1 | 6/2010 | Rodrigues et al. |
| 7,865,663 B1 | 1/2011 | Nelson et al. |
| 8,135,930 B1 | 3/2012 | Mattox et al. |
| 8,621,461 B1 | 12/2013 | Chandrachari et al. |
| 8,806,266 B1 | 8/2014 | Qu et al. |
| 9,344,493 B1 | 5/2016 | Anand |
| 9,553,788 B1 | 1/2017 | Callan |
| 9,841,988 B1 | 12/2017 | Magnezi et al. |
| 9,871,712 B1 | 1/2018 | Sorenson, III et al. |
| 9,984,140 B1 | 5/2018 | Sukumaran et al. |
| 10,511,514 B1 | 12/2019 | Vytla et al. |
| 10,623,319 B1 | 4/2020 | Talnikov et al. |
| 10,659,366 B1 | 5/2020 | Mehr |
| 11,080,096 B1 | 8/2021 | Fakhouri et al. |
| 11,128,573 B2 | 9/2021 | Busick et al. |
| 11,146,564 B1 | 10/2021 | Ankam et al. |
| 11,316,822 B1 | 4/2022 | Gawade et al. |
| 11,522,808 B2 | 12/2022 | Busick et al. |

(Continued)

OTHER PUBLICATIONS

A Tutorial on SCSI-3 Persistent Group Reservations, Dec. 2012, SUSE Labs, Version 1.1, Retrieved from :URL: https://www.gonzoleeman.net/documents/scsi-3-pgr-tutorial-v11.pdf, 11 pages.

(Continued)

*Primary Examiner* — Midys Rojas
(74) *Attorney, Agent, or Firm* — Cooper Legal Group, LLC

(57) ABSTRACT

Techniques are provided for lock reservations for shared storage. A reserve command to reserve a storage structure is received by a driver from a node. The reserve command is formatted according to a storage protocol. The driver translates the reserve command into a lease acquire command formatted according to an object store protocol and targeting an object stored within an object store and corresponding to the storage structure. A lease identifier derived from a node identifier of the node is inserted into the lease acquire command. The lease acquire command is routed to the object store for obtaining a lease on the object for granting the node exclusive write access to the object.

20 Claims, 14 Drawing Sheets

(56) References Cited

U.S. PATENT DOCUMENTS

| | | |
|---|---|---|
| 11,855,905 B2 | 12/2023 | Busick et al. |
| 2002/0107966 A1 | 8/2002 | Baudot et al. |
| 2002/0199113 A1 | 12/2002 | Pfister et al. |
| 2003/0065782 A1 | 4/2003 | Nishanov et al. |
| 2003/0158933 A1 | 8/2003 | Smith |
| 2003/0200398 A1 | 10/2003 | Harris |
| 2003/0217241 A1 | 11/2003 | Chong, Jr. et al. |
| 2004/0233910 A1 | 11/2004 | Chen et al. |
| 2006/0133418 A1 | 6/2006 | Anand |
| 2006/0259641 A1 | 11/2006 | Kim et al. |
| 2008/0028145 A1 | 1/2008 | Lecomte et al. |
| 2009/0007135 A1 | 1/2009 | Rathunde et al. |
| 2010/0088698 A1 | 4/2010 | Krishnamurthy |
| 2010/0287416 A1 | 11/2010 | Shacham et al. |
| 2013/0346573 A1 | 12/2013 | Hemachandran et al. |
| 2014/0143401 A1 | 5/2014 | Carlen et al. |
| 2014/0229606 A1 | 8/2014 | Griswold et al. |
| 2014/0359612 A1 | 12/2014 | D'Amato et al. |
| 2014/0359698 A1 | 12/2014 | Sorenson, III et al. |
| 2015/0309892 A1 | 10/2015 | Ramasubramaniam et al. |
| 2015/0312337 A1 | 10/2015 | Keremane et al. |
| 2015/0372935 A1 | 12/2015 | Åkervik et al. |
| 2016/0055018 A1 | 2/2016 | Usgaonkar et al. |
| 2016/0127307 A1 | 5/2016 | Jain et al. |
| 2016/0139943 A1 | 5/2016 | Bezbaruah et al. |
| 2016/0173517 A1 | 6/2016 | Diaz et al. |
| 2016/0261688 A1 | 9/2016 | Anand |
| 2016/0315858 A1 | 10/2016 | Vytla et al. |
| 2017/0060705 A1 | 3/2017 | Sridhara |
| 2017/0109184 A1 | 4/2017 | Ramani et al. |
| 2017/0249082 A1 | 8/2017 | Litke et al. |
| 2017/0272523 A1 | 9/2017 | Cillis et al. |
| 2017/0322851 A1 | 11/2017 | Brown |
| 2017/0346686 A1 | 11/2017 | Mudigonda |
| 2018/0034769 A1 | 2/2018 | Modi et al. |
| 2018/0054475 A1 | 2/2018 | Agarwal et al. |
| 2018/0063231 A1 | 3/2018 | Park |
| 2018/0063233 A1 | 3/2018 | Park |
| 2018/0091591 A1 | 3/2018 | Puri et al. |
| 2018/0232395 A1 | 8/2018 | Deshmukh et al. |
| 2018/0255463 A1 | 9/2018 | Zheng et al. |
| 2018/0260261 A1 | 9/2018 | Mohammed et al. |
| 2019/0007206 A1 | 1/2019 | Surla et al. |
| 2019/0102455 A1 | 4/2019 | Radhakrishnan et al. |
| 2019/0278524 A1 | 9/2019 | Dev et al. |
| 2019/0280917 A1 | 9/2019 | Hughes et al. |
| 2019/0306231 A1 | 10/2019 | Shimoga Manjunatha et al. |
| 2019/0311049 A1 | 10/2019 | Bhargava M R et al. |
| 2020/0034191 A1 | 1/2020 | Tarasuk-Levin et al. |
| 2020/0036578 A1 | 1/2020 | Gupta et al. |
| 2020/0036638 A1 | 1/2020 | Li et al. |
| 2020/0092138 A1 | 3/2020 | Tillotson et al. |
| 2020/0092201 A1 | 3/2020 | Tillotson et al. |
| 2020/0099659 A1 | 3/2020 | Cometto et al. |
| 2020/0125386 A1 | 4/2020 | Busick et al. |
| 2020/0125537 A1* | 4/2020 | Busick .................. H04L 47/786 |
| 2020/0213185 A1 | 7/2020 | Hughes et al. |
| 2020/0280519 A1 | 9/2020 | Sharifi Mehr |
| 2020/0382403 A1 | 12/2020 | Borisov et al. |
| 2021/0006473 A1 | 1/2021 | Chitalia et al. |
| 2021/0044523 A1 | 2/2021 | Kawatani |
| 2021/0058364 A1 | 2/2021 | Tillotson et al. |
| 2021/0083932 A1 | 3/2021 | Hughes et al. |
| 2021/0092639 A1 | 3/2021 | Larsson et al. |
| 2022/0006755 A1 | 1/2022 | Busick et al. |
| 2022/0174042 A1 | 6/2022 | Cometto et al. |
| 2023/0087493 A1 | 3/2023 | Busick et al. |
| 2024/0137329 A1 | 4/2024 | Busick et al. |

OTHER PUBLICATIONS

Anonymous, "A Method for Load Balancer Cluster as a Service in Openstack Cloud System," Sep. 19, 2016, IP.com Prior Art Database Technical Disclosure, retrieved from URL: [https://ip.com/IPCOM/000247596], pp. 1-9.

Branden R., et al., "Resource ReSerVation Protocol (RSVP)—Version 1 Functional Specification," RFC 2205, 1997, Network Working Group, 110 pages. Retrieved from the Internet: URL: https://datatracker.ietf.org/doc/html/rfc2205.

Non-Final Office Action mailed on Apr. 18, 2023 for U.S. Appl. No. 18/071,778, filed Nov. 30, 2022, 10 pages.

Notice of Allowance mailed on Jun. 23, 2023 for U.S. Appl. No. 16/658,302, filed Oct. 21, 2019, 02 pages.

Notice of Allowance mailed on Aug. 29, 2023 for U.S. Appl. No. 18/071,778, filed Nov. 30, 2022, 6 pages.

Notice of Allowance mailed on Aug. 9, 2023 for U.S. Appl. No. 18/071,778, filed Nov. 30, 2022, 09 pages.

Final Office Action mailed on May 19, 2022 for U.S. Appl. No. 16/658,302, filed Oct. 21, 2019, 32 pages.

Non-Final Office Action mailed on Dec. 7, 2021 for U.S. Appl. No. 16/658,302, filed Oct. 21, 2019, 28 pages.

Non-Final Office Action mailed on May 2, 2022 for U.S. Appl. No. 16/658,648, filed Oct. 21, 2019, 13 pages.

Non-Final Office Action mailed on Sep. 28, 2022 for U.S. Appl. No. 16/658,302, filed Oct. 21, 2019, 37 pages.

Notice of Allowance mailed on Aug. 3, 2022 for U.S. Appl. No. 16/658,648, filed Oct. 21, 2019, 8 pages.

Notice of Allowance mailed on Aug. 3, 2023 for U.S. Appl. No. 16/658,302, filed Oct. 21, 2019, 02 pages.

Notice of Allowance mailed on Mar. 10, 2023 for U.S. Appl. No. 16/658,302, filed Oct. 21, 2019, 8 pages.

Notice of Allowance mailed on May 21, 2021 for U.S. Appl. No. 16/658,280, filed Oct. 21, 2019, 9 pages.

Non-Final Office Action mailed on Sep. 13, 2024 for U.S. Appl. No. 17/479,254, filed Sep. 20, 2021, 13 pages.

Notice of Allowance mailed on Nov. 22, 2024 for U.S. Appl. No. 18/541,762, filed Dec. 15, 2023, 11 pages.

* cited by examiner

LOCK RESERVATIONS FOR SHARED STORAGE

RELATED APPLICATIONS

This application claims priority to and is a continuation of U.S. application Ser. No. 16/658,302, filed on Oct. 21, 2019, titled "LOCK RESERVATIONS FOR SHARED STORAGE," which claims priority to U.S. Provisional Patent Application, titled "HIGH AVAILABILITY FOR CLOUD, SHARED STORAGE WITH LOCKING, AND IP FAILOVER USING NETWORK LOAD BALANCER", filed on Oct. 20, 2018 and accorded U.S. Application No. 62/748,409, which is incorporated herein by reference.

BACKGROUND

An object store environment, such as a cloud computing environment, can be used to host nodes such as virtual machines that provide services to client devices that connect to the object store environment over a network. In an example, a first node and a second node may be configured as high availability partners that are hosted as virtual machines by the object store environment. The first node and the second node may be maintained by a storage service provider so that the first node and the second node can provide storage services to clients of the storage service provider. The first node and the second node may store data within objects stored within an object store (e.g., storage) of the object store environment.

The nodes may be configured to use a storage protocol, such as a small computer system interface (SCSI) protocol, to access block devices of storage. The storage protocol may support various commands such as persistent reservation commands that allow the nodes to share storage in a manner that reduces data corruption. In particular, the first node can utilize a reserve command to obtain exclusive write access to a disk so that only the first node can write to the disk while other nodes may be able to merely read from the disk. Unfortunately, these types of commands, formatted according to the storage protocol, are not compatible with the object store environment that utilizes a different object store protocol and format. Thus, the nodes have no way to share storage without the potential of data corruption because the nodes are unable to natively obtain exclusive write access to an object within the object store.

DETAILED DESCRIPTION

Figure 1:
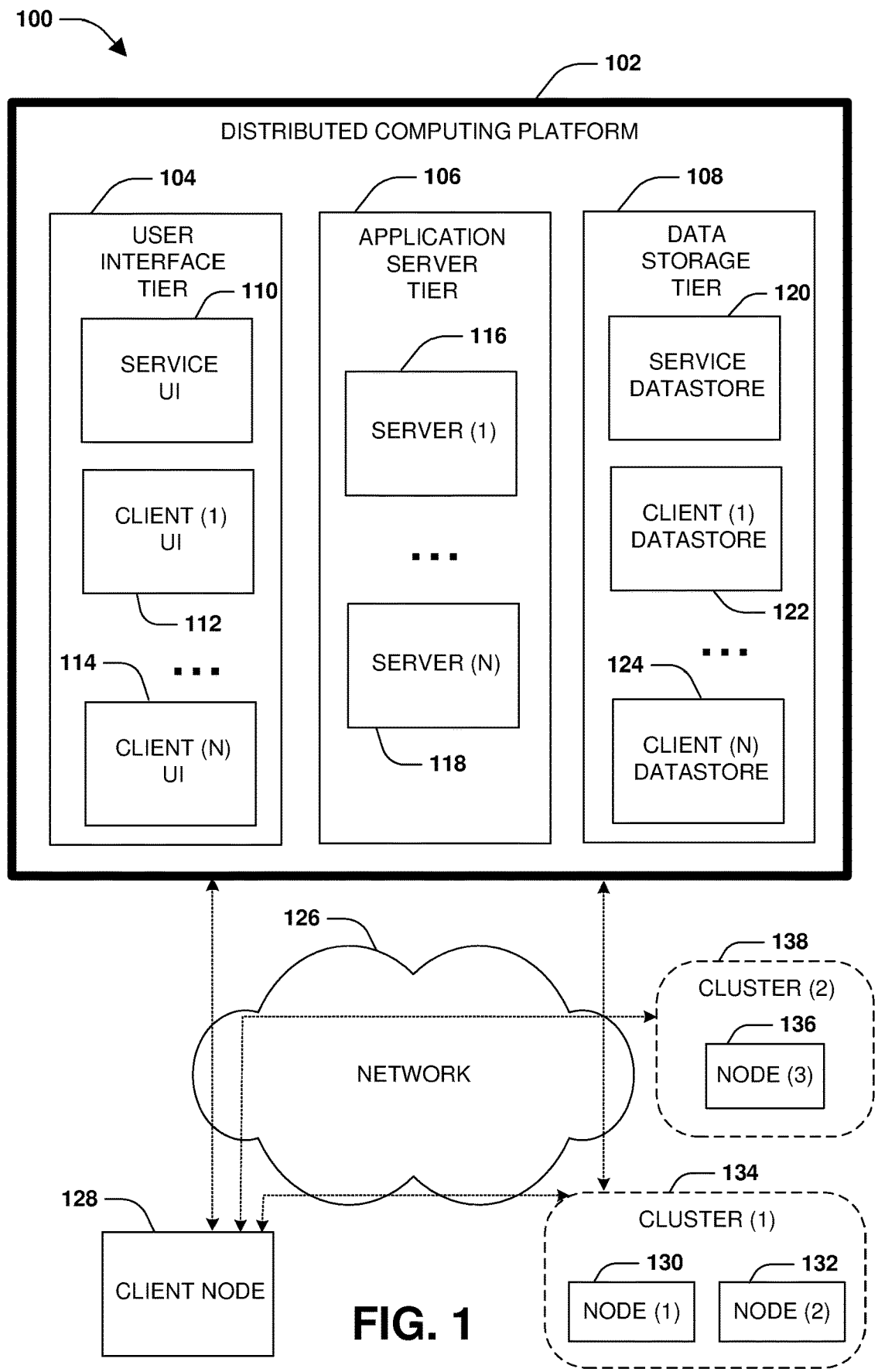
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Nodes, such as virtual machines that provide storage services for client devices, can be configured according to a high availability configuration where a first node is a primary partner that actively processes requests from client devices and a second node is a secondary partner that can takeover for the first node if the first node fails. The nodes may be hosted by an object store environment, such as through virtual machines hosted within a cloud computing environment. The first node and the second node may store data within objects stored within an object store of the object store environment. Because the second node may takeover for the first node if the first node fails, the second node may be configured with shared access to objects of the first node so that the second node can take over the objects. In this way, the second node can provide clients with access to client data within the objects in place of the failed first node. However, data corruption could occur if pending I/O from the failed first node are executed upon an object taken over by the second node or if the first node has not actually failed and continues writing to the object taken over by the second node. Thus, there is a need for the nodes to be able to obtain exclusive leases on objects for exclusive write access to the objects so another node, currently not owning an object, cannot write to the object and cause data corruption. Unfortunately, the nodes do not comprise native capabilities to obtain exclusive leases on objects because the nodes utilize a storage protocol (e.g., a SCSI protocol) that provides persistent reservations, which is not supported by the object store environment that instead uses a different object store protocol.

Accordingly, as provided herein, a driver is configured to intercept commands that are received from nodes and are formatted according to the storage protocol (e.g., a SCSI format). The driver translates those commands to commands formatted according to an object store protocol (e.g., a representational state transfer (REST) protocol through which page blob lease commands can be implemented using HTTP requests upon objects/page blobs within the object store environment) used by the object store environment. In this way, the nodes can issue reserve, release, clear, preempt, and/or other commands having a storage protocol format, which will be intercepted and translated by the driver into translated commands having an object storage protocol format. The translated commands can be executed against objects within an object store of the object store environment in order to acquire, change, break, and read leases on the objects that grant exclusive write access to the objects.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be create by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138.

During synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SMVs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements, which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
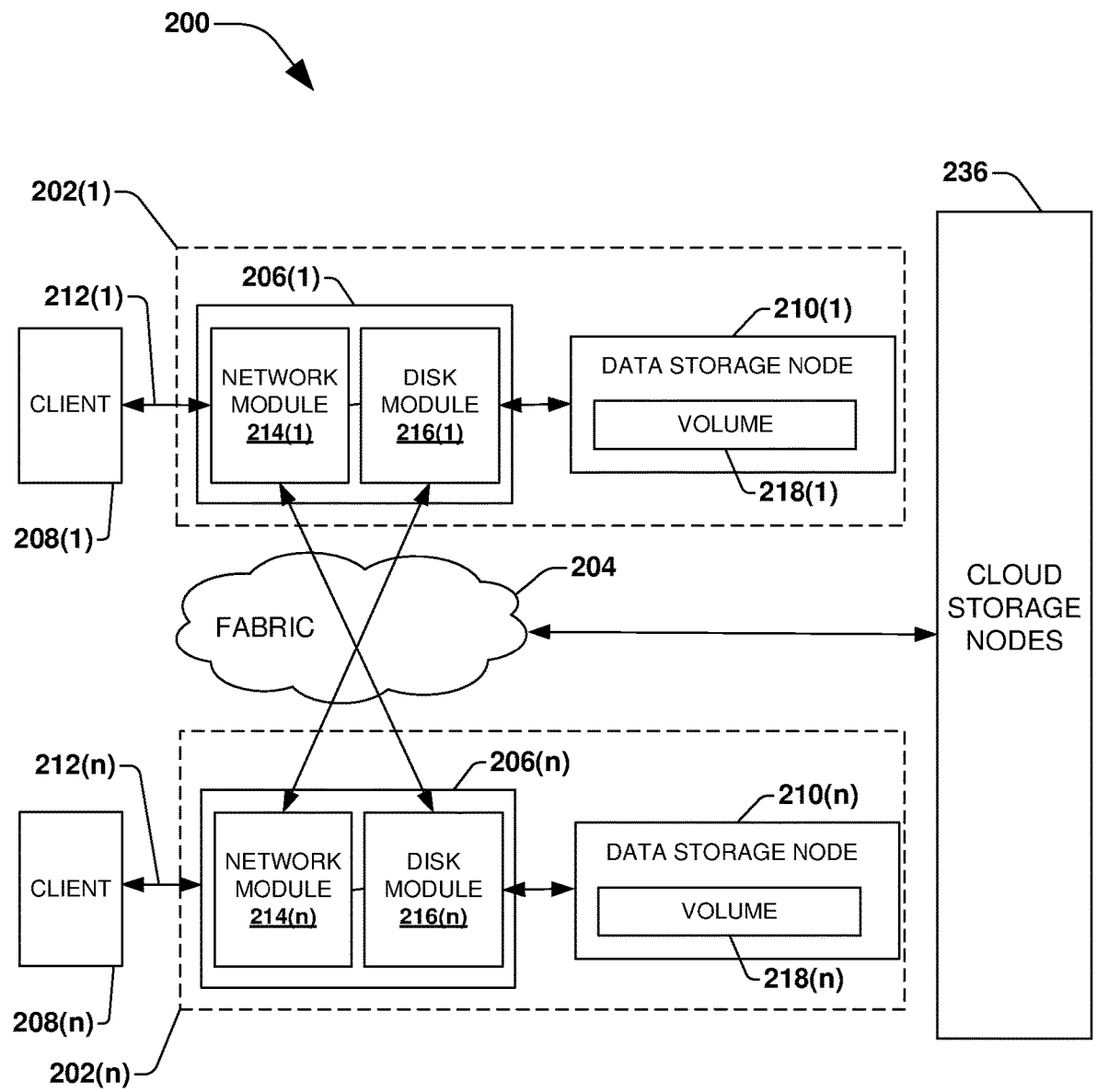
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236. The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n). The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(2), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(2) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
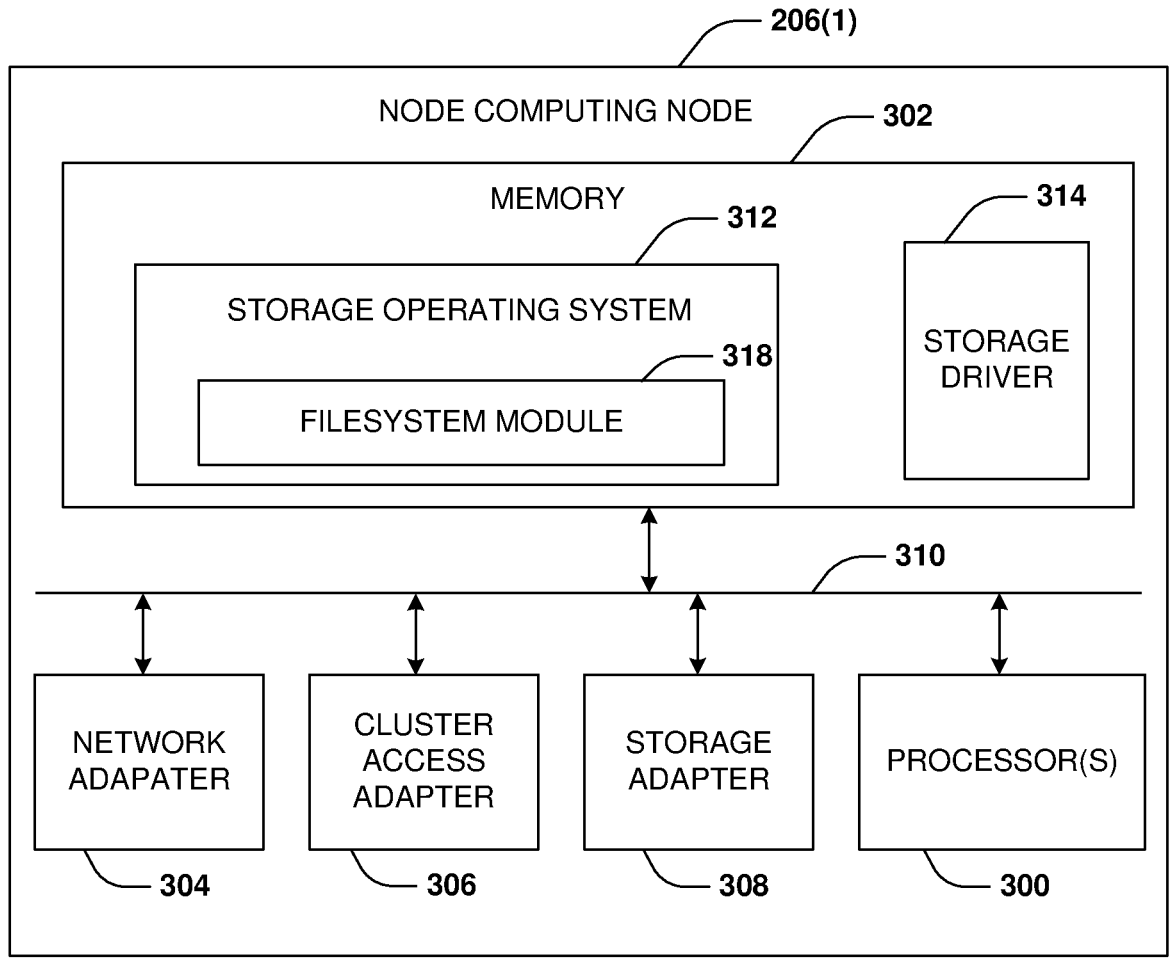
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
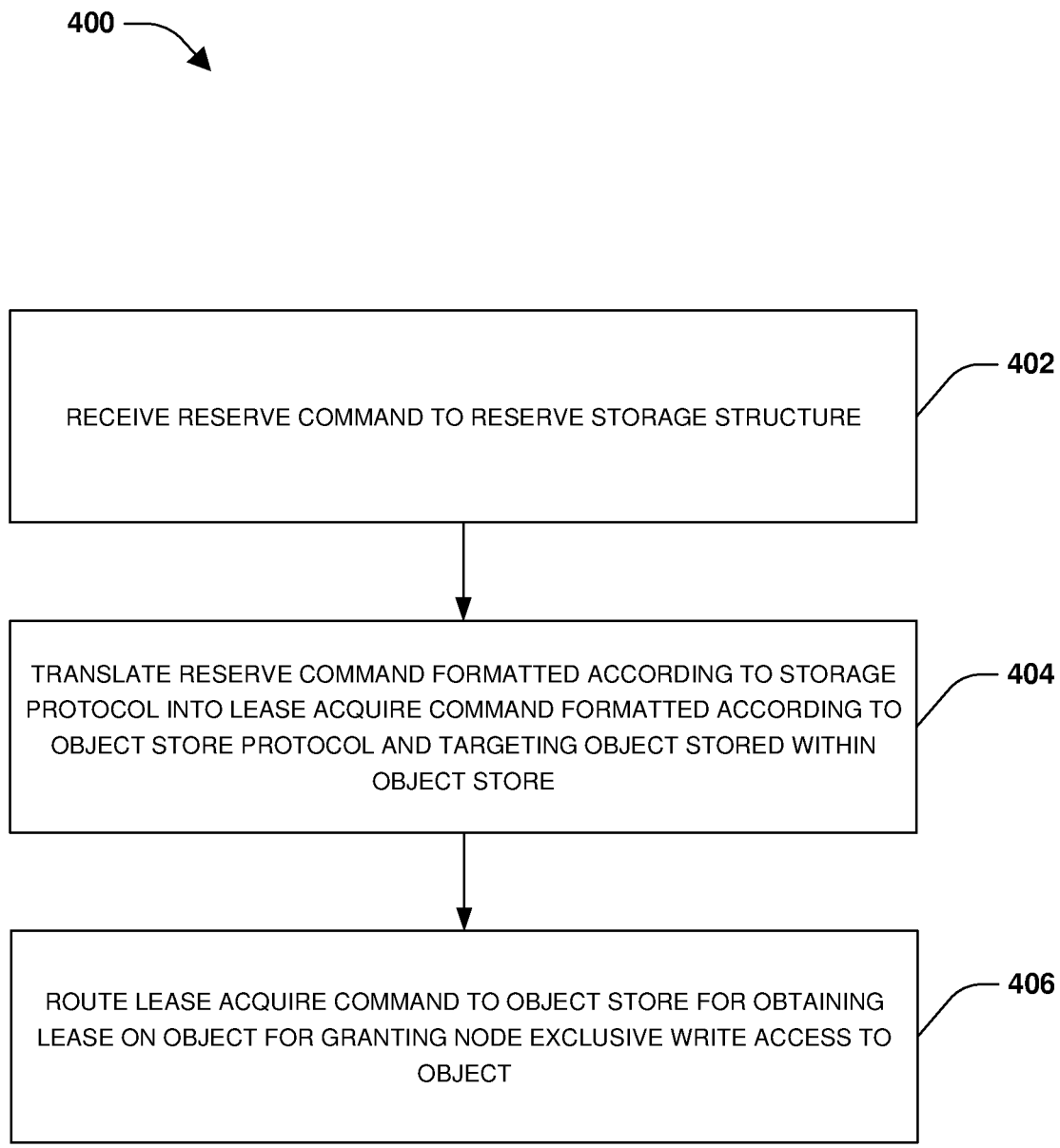
FIG. 4 is a flow chart illustrating an example method for lock reservations for shared storage.
Figure 5A:
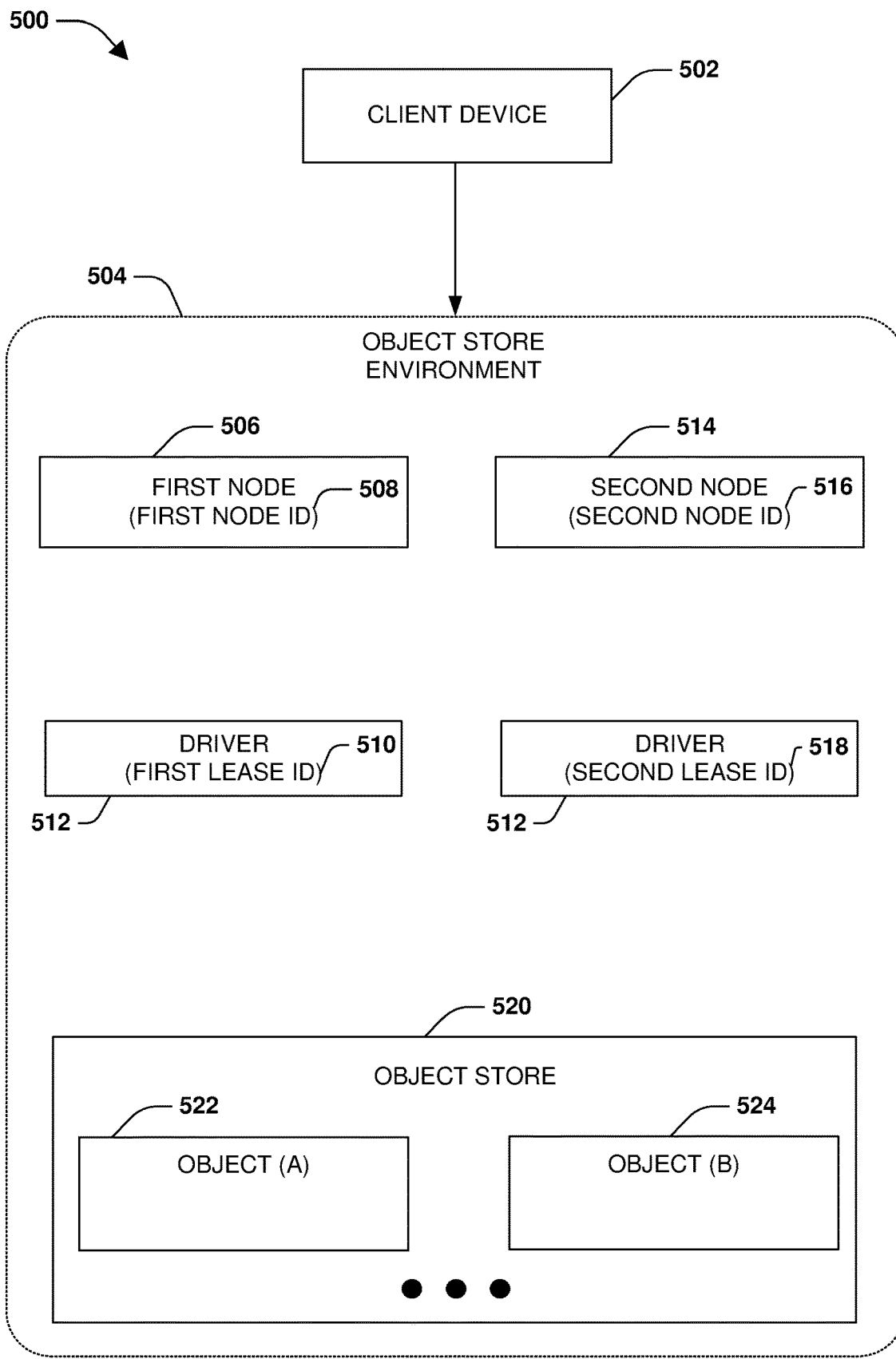
FIG. 5A is a block diagram illustrating an example system for lock reservations for shared storage.

One embodiment of lock reservations for shared storage is illustrated by an exemplary method 400 of FIG. 4 and further described in conjunction with system 500 of FIGS. 5A-5I. FIG. 5A illustrates an object store environment 504, such as a cloud computing environment hosted by a 3$^{rd}$ party cloud service provider. The object store environment 504 comprises an object store 520 of storage within which data can be stored in objects, such as page blobs. Various clients of a provider of the object store environment 504 may deploy nodes, such as virtual machines, into the object store environment 504 for hosting. For example, a storage service provider may deploy a first node 506, a second node 514, and/or other nodes into the object store environment 504 for hosting. The first node 506 and/or the second node 514 may be implemented as virtual machines (e.g., storage virtual machines), hardware, software, or combination thereof. The first node 506 and the second node 514 may be configured to store data, such as user data from a client device 502 of a client of the storage service provider, within objects stored within the object store 520.

The first node 506 and the second node 514 may be configured as high availability partners. In particular, the first node 506 may be configured to actively process requests from client devices, such as read/write operations targeting a volume maintained by the first node 506 for storing data on behalf of the client device 502. The volume may be stored within one or more objects within the object store 520. The second node 514 may be configured to passively wait to take over for (failover from) the first node 506 in the event the first node 506 is unable to process requests such as due to a failure. The second node 514 may or may not process other requests from client devices while passively waiting to take over for the first node 506. In this way, the second node 514 may be configured with shared access to objects stored by the first node 506 within the object store 520 in the event the second node 514 takes over for the failed first node 506 in order to provide clients with access to data within the objects that was previously provided by the first node 506.

Unfortunately, data corruption can occur if both the first node 506 and the second node 514 have concurrent write access to an object because one of the nodes may modify data within the object that the other node may be unaware of such (e.g., a pending I/O operation issued by the first node 506 before failure could modify an object taken over by the second node 514 during failover, thus causing data corruption). Thus, there needs to be a way to obtain exclusive write access to an object (e.g., a lease on an object where there merely a single node is able to write to the object and any number of nodes may be able to read from the object).

The first node 506 and the second node 514 may operate utilizing a storage protocol, such as a SCSI protocol for interacting with storage (e.g., the first node 506 may host a virtual machine that uses SCSI formatted protocol commands to access virtual disks of the virtual machine). The storage protocol may comprise commands that would enable the first node 506 and the second node 514 to acquire, modify, and release SCSI persistent reservations on disks for exclusive write access to the disks upon which a node has a SCSI persistent reservation. This would prevent data corruption since the SCSI persistent reservations could be used to ensure that no more than a single node has write access to a disk at any given time. Unfortunately, these SCSI formatted protocol commands are not supported by the object store environment for objects, and thus the nodes would be unable to natively acquire/enable exclusive write access to objects.

Accordingly, a driver 512 (e.g., any type of software, component, module, hardware, or a combination thereof) is provided herein for translating commands formatted according to the storage protocol (e.g., SCSI commands from the first node 506) into commands formatted according to an object store protocol (e.g., a representational state transfer (REST) protocol through which page blob lease commands can be implemented using HTTP requests), which are understood by the object store environment 504 and can be natively executed upon object within the object store 520.

The first node 506 may have a first node identifier 508, such as an identifier of a non-volatile memory (NVRAM) of the first node 506. The driver 512 may generate a first lease identifier 510 for the first node 506 based upon the first node identifier 508. The second node 514 may have a second node identifier 516, such as an identifier of a non-volatile memory (NVRAM) of the second node 514. The driver 512 may generate a second lease identifier 518 for the second node 514 based upon the second node identifier 516. The first node 506 and the second node 514 may exchange the first node identifier 508 and/or the second node identifier 516 with one another.

Figure 5B:
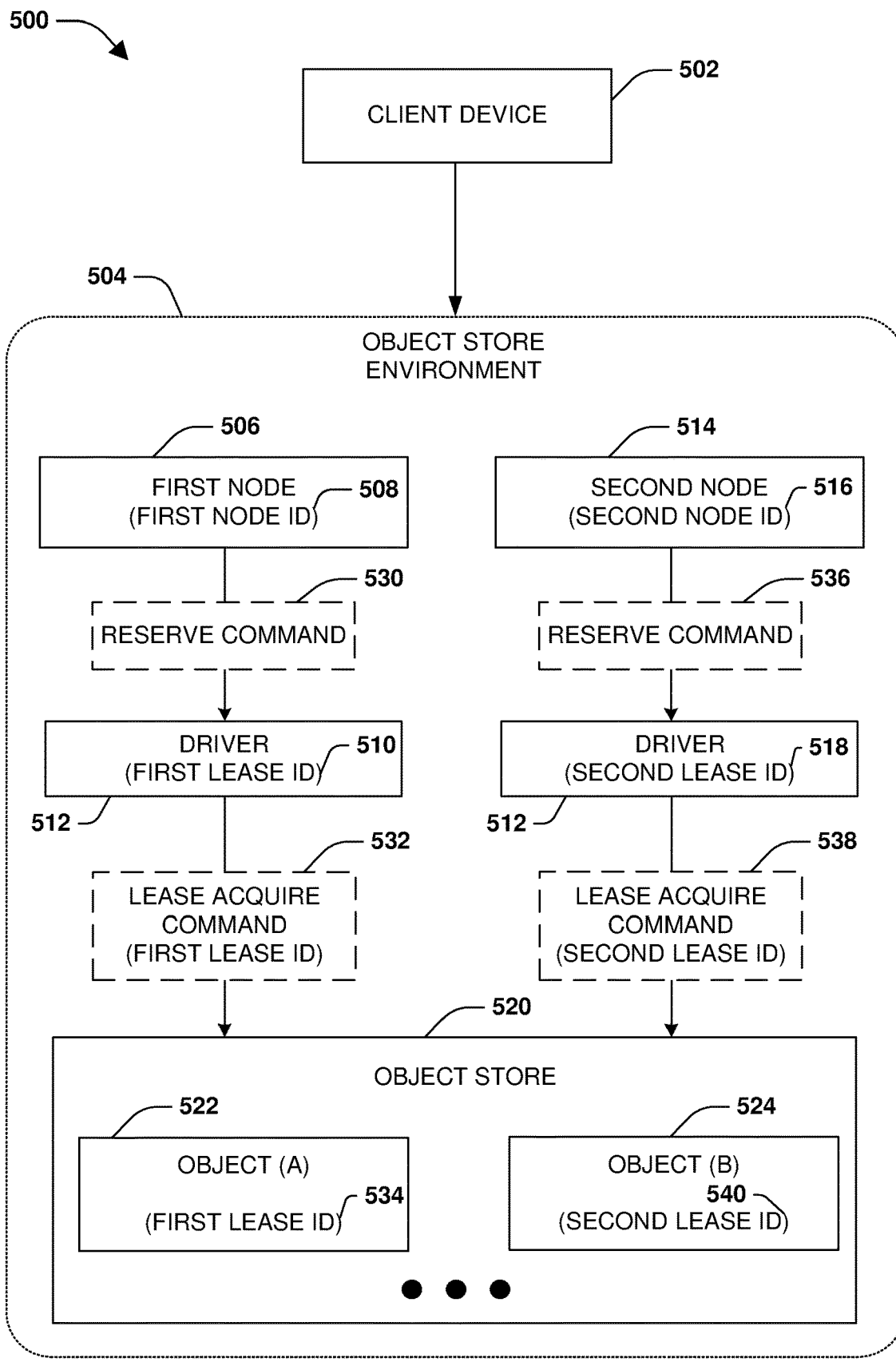
FIG. 5B is a block diagram illustrating an example system for lock reservations for shared storage, where reserve commands are translated into lease acquire commands.

In an example, the first node 506 may initialize and generate a storage structure such as an aggregate with a disk (e.g., a virtual machine disk used by a virtual machine hosted by the first node 506). In order to generate the storage structure such as the aggregate with the disk, an object (A) 522 is created within the object store 520 so that data of the storage structure can be stored by the first node 506 within the object (A) 522. The first node 506 issues a reserve command 530 formatted according to the storage protocol (e.g., a SCSI reserve command) natively supported by the first node 506 for accessing the storage structure, as illustrated by FIG. 5B. The reserve command 530 may specify that the first node 506 is attempting to reserve the storage structure (e.g., the disk). Since the object store environment 504 and/or the object store 520 may not natively support the reserve command 530, the driver 512 intercepts the reserve command 530, at 402.

At 404, the driver 512 translates the reserve command 530 into a lease acquire command 532 formatted according to the object store protocol and targeting the object (A) 522 within the object store 520. The driver 512 inserts the first lease identifier 510 into the lease acquire command 532. The driver 512 routes the lease acquire command 532 to the object store 520 for obtaining a lease on the object (A) for granting the first node 506 exclusive write access to the object (A) 522, at 406. In this way, the first node 506 acquires a lease 534 on the object (A) 522.

If the object store 520 returns a success message for the lease acquire command 532, then the driver 512 transmits a success message to the first node 506. The success message may be formatted according to the storage protocol (e.g., a SCSI reservation response command). If the object store 520 returns a lease identifier mismatch message to the driver 512, then the driver 512 determines that the object (A) 522 already has a lease with a different lease identifier (e.g., a different node already has a lease on the object (A) 522). Accordingly, the driver 512 transmits a reservation conflict message to the first node 506. The reservation conflict message may be formatted according to the storage protocol (e.g., a SCSI reservation conflict message). If the object store 520 returns a lease already present message, then the driver 512 determines that the first node 506 already has a lease on the object (A) 522. Accordingly, the driver 512 transmits the reservation conflict message to the first node 506. If any other type of error is returned by the object store 520, then the driver 512 will retry the lease acquire command 532 up until a timeout. For example, the driver 512 may retry the lease acquire command 532 for each error returned within a 1 minute timeout period.

The second node 514 may initialize and issue a read reservation command formatted according to the storage protocol to determine the status of storage structures (e.g., A SCSI read reservation command to identify SCSI reservations on disks of aggregates owned by virtual machines hosted by nodes), such as ownership of the storage structures. The driver 512 may intercept the read reservation command because the object store environment 504 and object store 520 does not natively support read reservation commands for objects. Accordingly, the driver 512 translates the read reservation command into a get object command supported by the object store environment 504 and the object store 520. The driver 512 may insert the second lease identifier 518 of the second node 514 into the get object command, and transmit the get object command to the object store 520. The get object command may be formatted according to the object store protocol.

If the object store 520 returns a success message for the get object command because the second lease identifier matches a current lease identifier of a lease on an object, then the driver 512 returns a response to the read reservation command to the second node 514 with the second lease identifier of the second node 514 as a key to indicate that the second node 514 already has a lease on that object. The response may be formatted according to the storage protocol (e.g., a SCSI response). If the object store 520 returns a lease identifier mismatch message because a current lease on an object has a different lease identifier than the second lease identifier 518 within the get object command, then the driver 512 returns a response to the read reservation command to the second node 514 with the first lease identifier 510 of the first node 506 (a partner lease identifier) as a key to indicate that the first node 506 has a lease on that object. For example, the first node 522 has the lease 534 on the object (A) 522, and thus the first lease identifier 510 of the first node 506 will be returned to the second node 514 in a response to a read reservation command translated into a get object command targeting the object (A) 522. Thus, the second node 514 will not attempt to place a reservation on the object (A) 522 already leased by the first node 506. The response may be formatted according to the storage protocol (e.g., a SCSI response).

If the object store 520 returns a lease not present message or lease lost error because an object such as the object (B) 524 is not leased, then the driver 512 returns a response to the read reservation command to the second node 514 without any keys to indicate that the object (B) 524 is not currently leased. The response may be formatted according to the storage protocol (e.g., a SCSI response). In an example, the second node 514 may issue a reserve command 536 to reserve a data structure (e.g., a disk) corresponding to the object (B) 524 based upon the response indicating that the object (B) 524 is not leased and thus is available. The driver 512 may intercept the reserve command 536 formatted according to the storage protocol (e.g., a SCSI reserve command), and translate the reserve command 536 from the storage protocol to a lease acquire command 538 formatted according to the object store protocol. The driver 512 may insert the second lease identifier 518 of the second node 514 into the lease acquire command 538. The driver 512 may route the lease acquire command 538 to the object store 520 in order to acquire a lease 540 on the object (B) 524. Upon receiving a success message from the object store 520, the driver 512 transmits a success message to the second node 514. The success message may be formatted according to the storage protocol (e.g., a SCSI response).

Figure 5C:
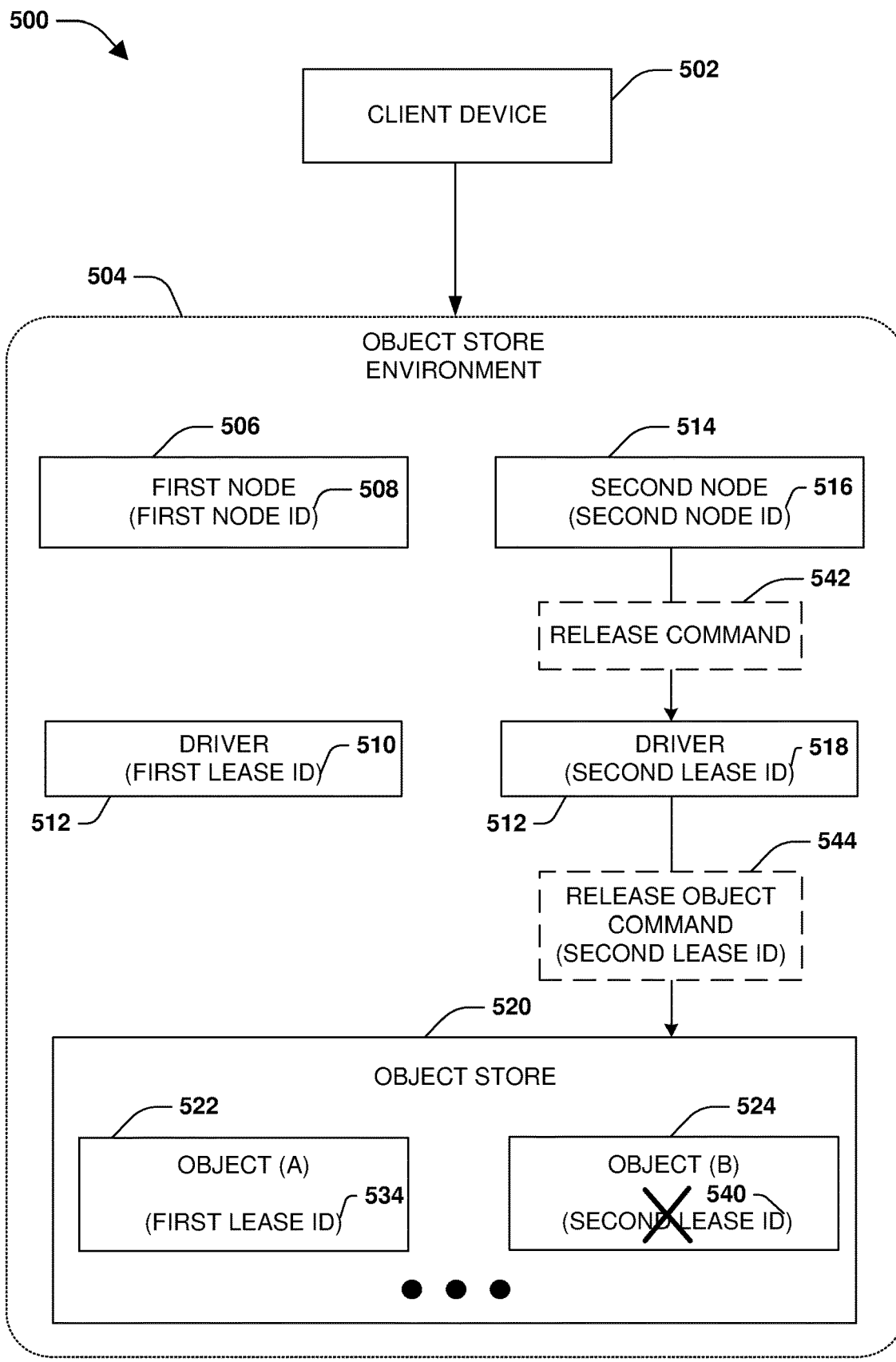
FIG. 5C is a block diagram illustrating an example system for lock reservations for shared storage, where a release command is translated into a release object command.

FIG. 5C illustrates the second node 514 issuing a release command 542 to release the storage structure (e.g., the disk) corresponding to the object (B) 524 within the object store 520. The release command 542 may be formatted according to the storage protocol (e.g., a SCSI reservation release command). The driver 512 intercepts the release command 542 because the object store environment 504 and the object store 520 does not support the release command 542. Accordingly, the driver 512 translates the release command 542 into a release object command 544 formatted according to the object store protocol supported by the object store 520 and object store environment 504. The driver 512 inserts the second lease identifier 518 of the second node 514 into the release object command 544, and transmits the release object command 544 to the object store 520. The object store 520 may remove the lease 540 owned by the second node 514 on the object (B) 524 based upon the second lease identifier 518 in the release object command 544 matching the lease 540.

Figure 5D:
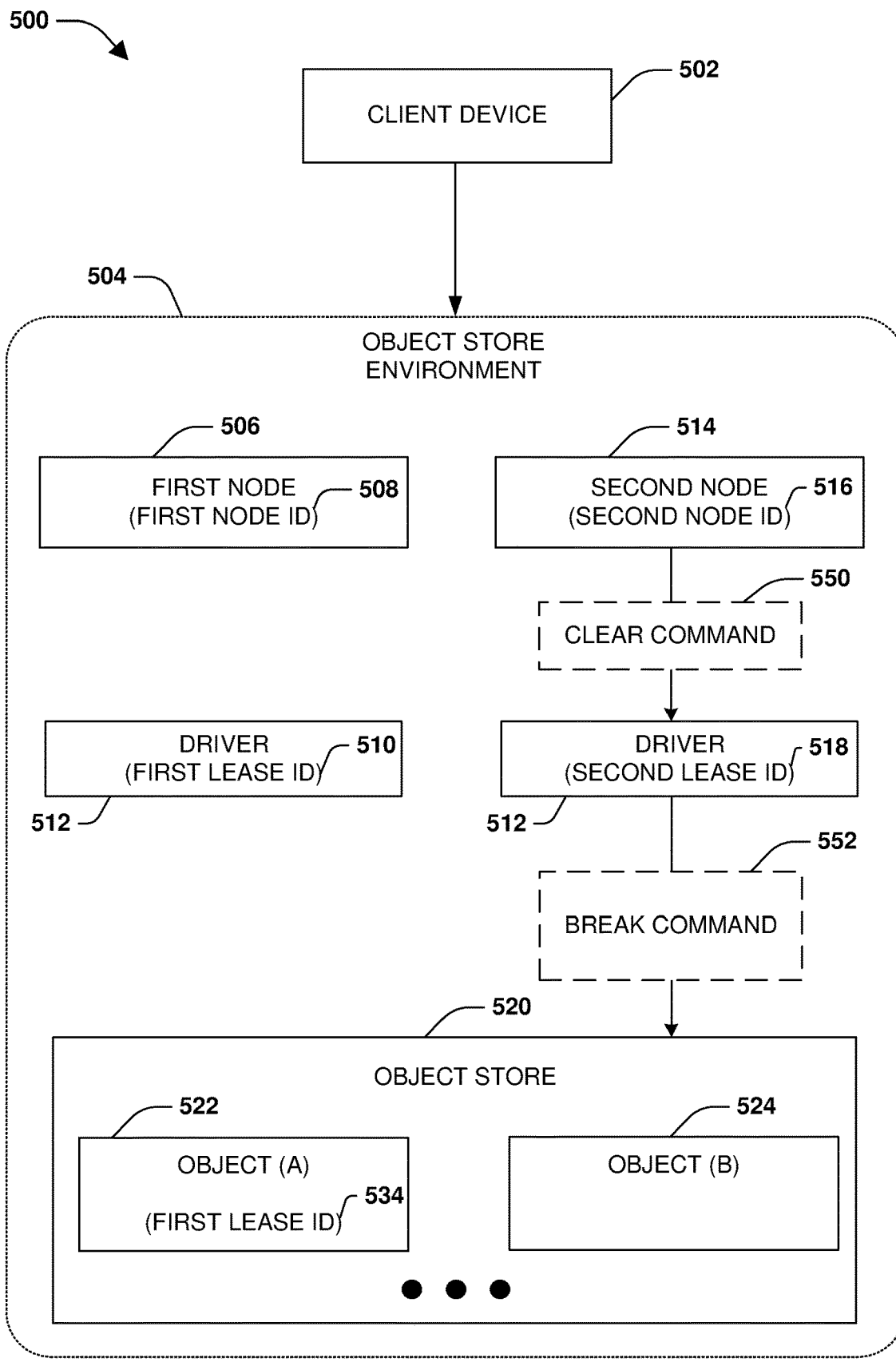
FIG. 5D is a block diagram illustrating an example system for lock reservations for shared storage, where a clear command is translated into a break command.

FIG. 5D illustrates the second node 514 issuing a clear command 550 for a storage structure corresponding to an object (C) not illustrated. Unlike the release command 542 and corresponding release object command 544 where the lease identifier within the release object command 544 must match a lease identifier of a lease on an object being released, the clear command 550 does not depend upon ownership. The clear command 550 may be formatted according to the storage protocol (e.g., a SCSI clear command). Thus, the driver 512 intercepts the clear command 550, and translates the clear command 550 into a break command 552 formatted according to the object store protocol. The driver 512 routes the break command 552 to the object store 520 to break the lease on the object (C). Responsive to the driver 512 receiving a lease not present message (e.g., the lease did not exist, an existing lease was broken, etc.) from the object store 520 for the break command 552, the driver 512 transmits a success message to the second node 514. The success message may be formatted according to the storage protocol (e.g., a SCSI response).

Figure 5E:
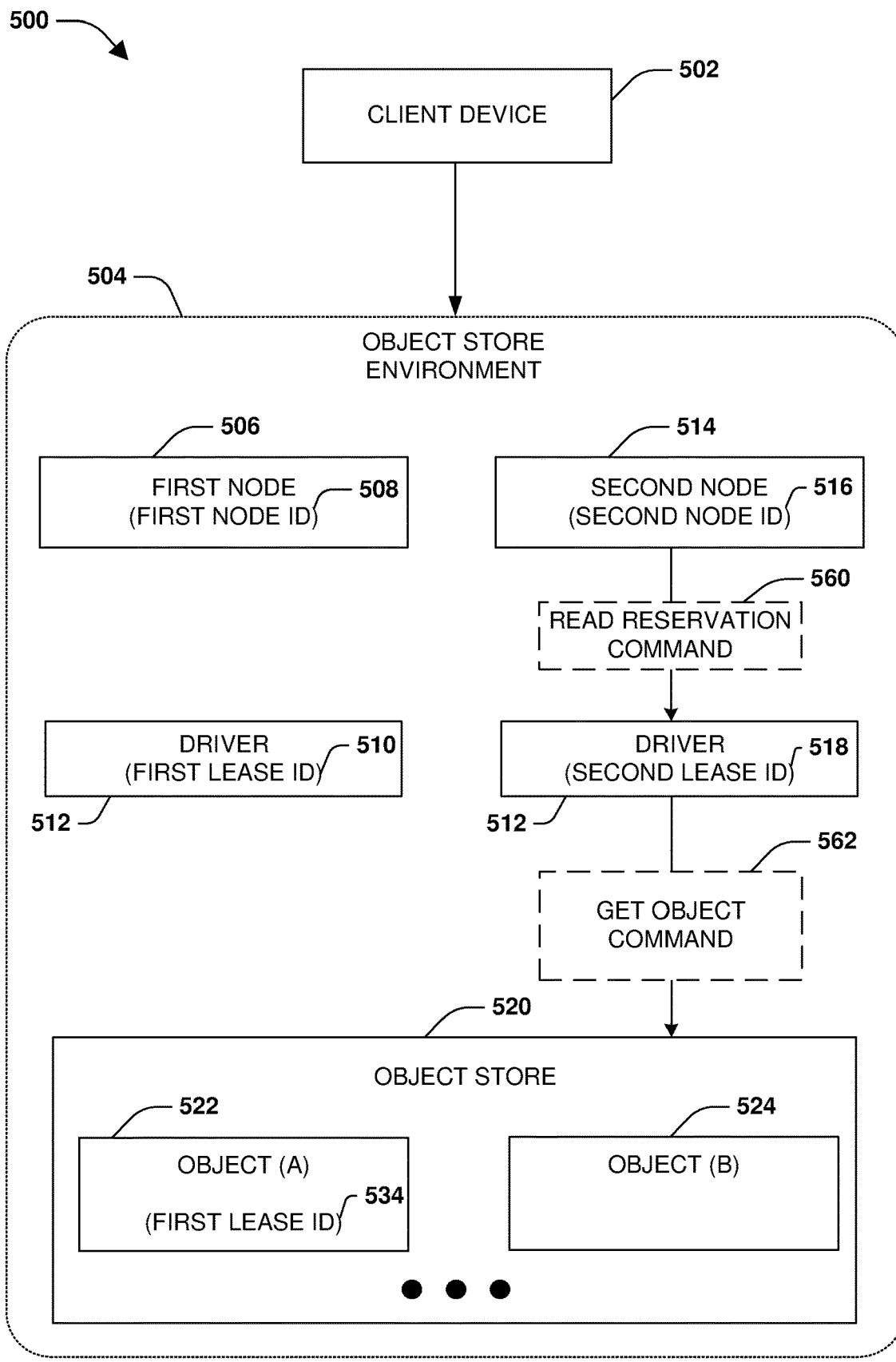
FIG. 5E is a block diagram illustrating an example system for lock reservations for shared storage, where a read reservation command is translated into a get object command.

FIG. 5E illustrates the second node 514 issuing a read reservation command 560 formatted according to the storage protocol. The driver 512 translates the read reservation command 560 into a get object command 562 formatted according to the storage object protocol, and transmits the get object command 562 to the object store 520. Based upon a response from the object store 520, the driver 512 will transmit a message indicating whether objects have leases, no leases, are leased by the second node 514, or are leased by another node.

Figure 5F:
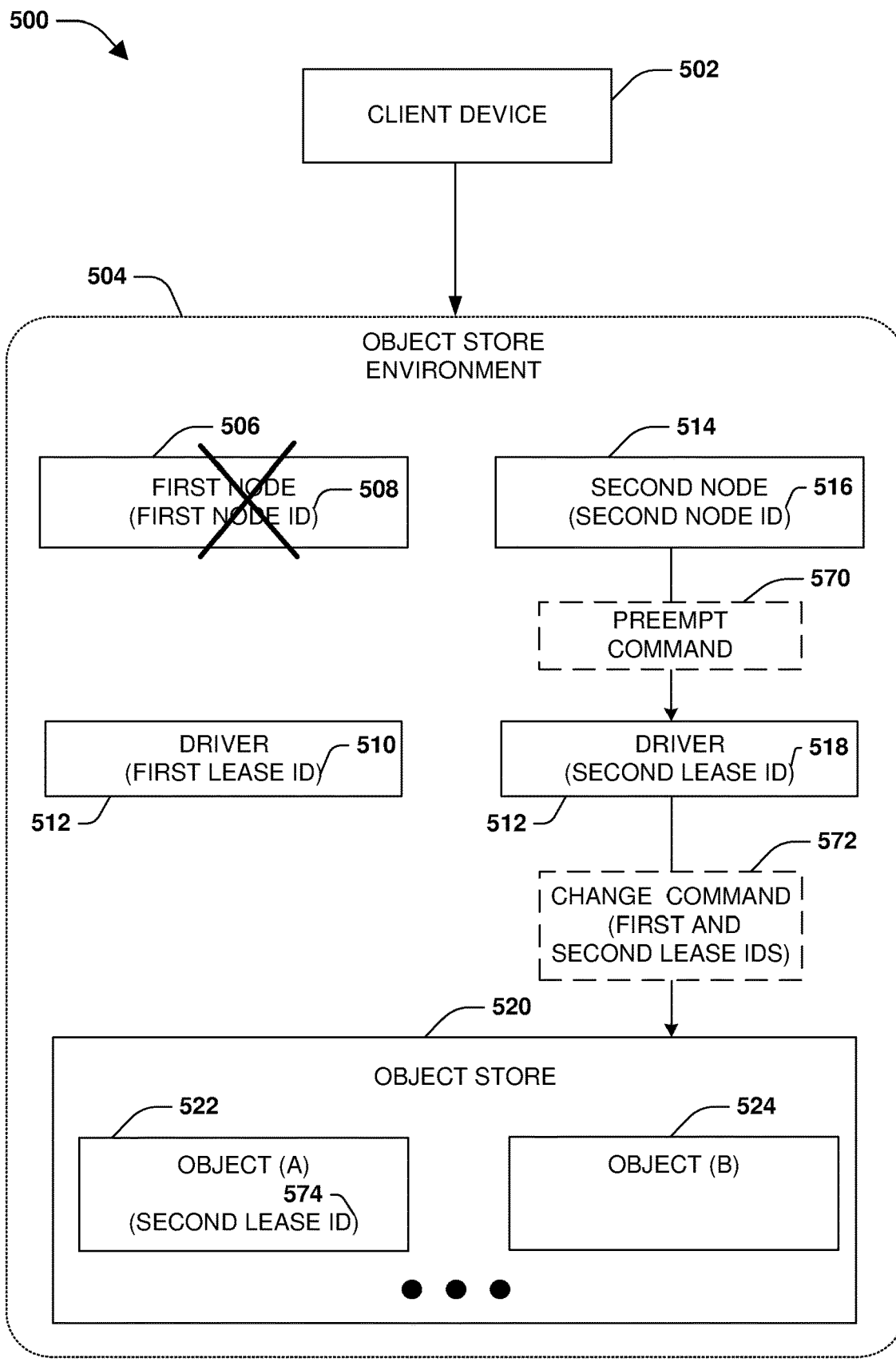
FIG. 5F is a block diagram illustrating an example system for lock reservations for shared storage, where a preempt command is translated into a change command.

FIG. 5F illustrates the second node 514 determining that the first node 506 has failed. In an example, the second node 514 may make this determination based upon a loss of a heartbeat signal exchanged between the first node 506 and the second node 514. In another example, the second node 514 may make this determination based upon a determination that the second node 514 has not accessed (e.g., written to) the object (A) 522 for a threshold amount of time. Accordingly, the second node 514 transmits a preempt command 570 to change a reservation on a storage structure (e.g., a disk) owned by the first node 506, which corresponds to the object (A) 522, so that the second node 514 can obtain exclusive write access to the object (A) 522 for taking over the servicing of client I/O from the failed first node 506. That is, the preempt command 570 is issued by the second node 514 to takeover for the failed first node 506 based upon the second node 514 detecting that the first node 506 failed.

Because the preempt command 570 is formatted according to the storage protocol (e.g., a SCSI preempt command) not supported by the object store environment 504 and object store 520, the driver 512 intercepts the preempt command 570, and translates the preempt command 570 into a change command 572 formatted according to the object store protocol understood by (supported by) the object store 520. The driver 512 may insert the first lease identifier 510 and the second lease identifier 518 into the change command 572 to indicate that the lease 534 owned by the first node 506 and having the first lease identifier 510 is to be change to being leased by the second node 514 with a lease 574 having the second lease identifier 518. The driver 512 transmits the change command 572 to the object store 520.

If the object store 520 returns a success message that the second node 514 now owns the lease 574 on the object (A) 522, then the driver 512 transmits a success message to the second node 514. In this way, the second node 514 has exclusive write access to the object (A) 522 in order to provide clients with read and write access to data stored within the object (A) 522 without the potential of data corruption resulting from the first node 506 attempting to write to the object (A) 522 (e.g., where the first node 506 did not actually fail but had an intermittent network connectivity issue with the second node 514) or any pending write operations from the first node 506 writing data to the object (A) 522 after the second node 514 has taken over the object (A) 522.

If the object store 520 returns a lease not present error for the change command 572 (e.g., there is currently no lease on the object (A) 522), then a lease acquire command is generated with the second lease identifier 518 and issued by the driver 512 to the object store 520 to acquire the lease 574 on the object (A) 522 for the second node 514. If the object store 520 returns a lease identifier mismatch error (e.g., the first lease identifier 510 specified within the change command 572 does not match a lease identifier of a current lease on the object (A) 522), then the driver 512 generates and issues a break lease command to the object store 520 to break the current lease. The break lease command is issued because it does not depend upon who is the current owner of the current lease. After the break lease command is successfully acknowledged by the object store 520, the driver 512 generates and issues a lease acquire command to the object store 520 with the second lease identifier 518 of the second node 514 to acquire the lease 574 on the object (A) 522.

In this way, the second node 514 has taken over for the first node 506, and has obtained exclusive write access to the object (A) 522 previously owned by the first node 506. Thus, the second node 514 can service client I/O directed to data within the object (A) 522 without the potential of data corruption from the first node 506 otherwise being able to write to the object (A) 522 if the lease 574 was not present. If for some reason the first node 506 is still operational (e.g., the second node 514 performed the failover due to a loss of heartbeat exchange between the first node 506 and the second node 514, but that the first node 506 was actually still operational and serving client I/O) and attempts to write to the object (A) 522, the attempted write will be blocked by the lease 574 owned by the second node 514 because the lease 574 grants exclusive write access to only the second node 514 for the object (A) 522. At this point, the first node 506 may realize that the second node has 514 taken over for the first node 506 and that the first node 506 should transition into a non-operational or passive state.

Figure 5G:
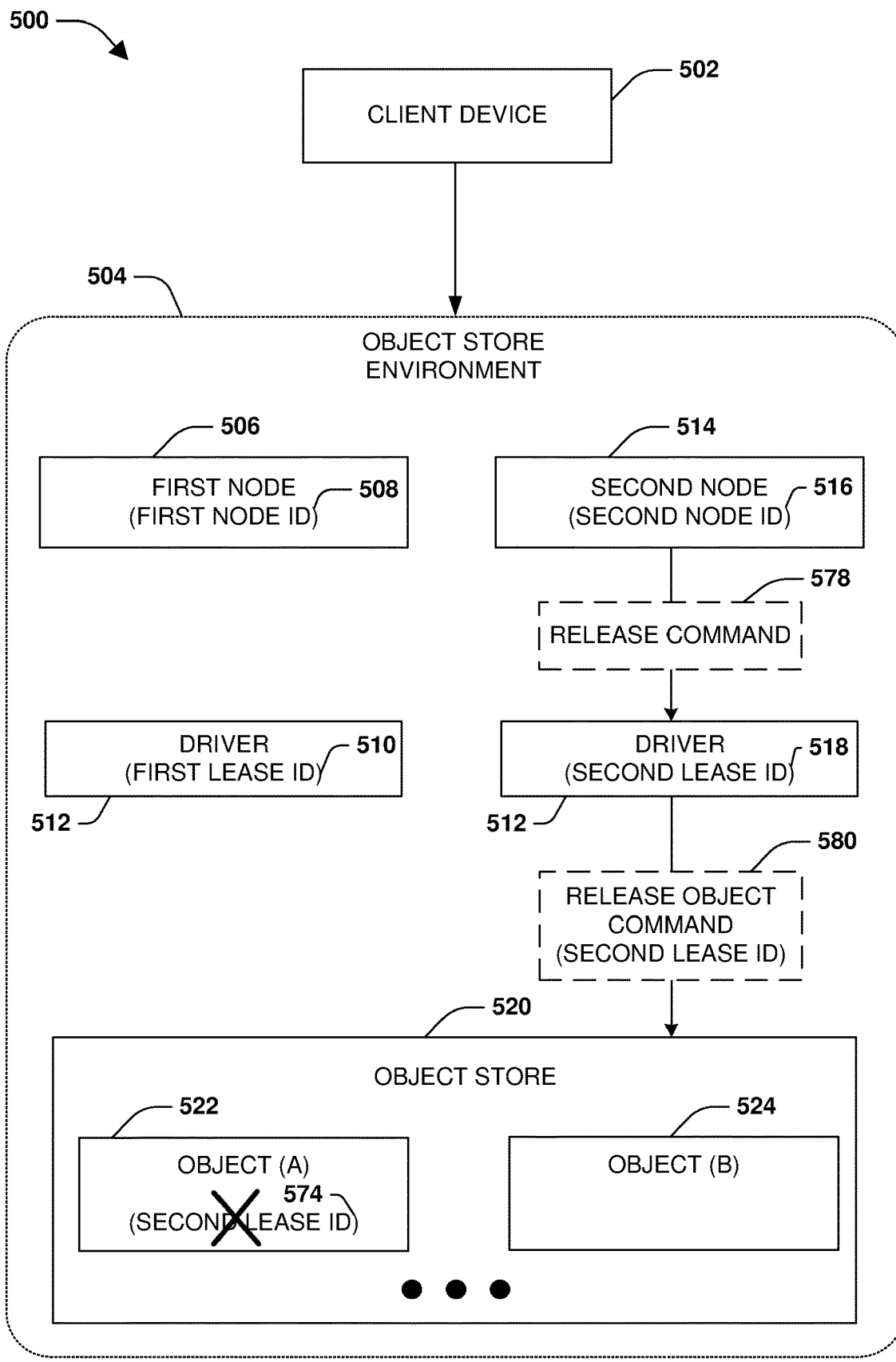
FIG. 5G is a block diagram illustrating an example system for lock reservations for shared storage, where a release command is translated into a release object command.

FIG. 5G illustrates the first node 506 recovering from the failure and initializing into an operational state. The first node 506 may establish a communication connection with the second node 514. The second node 514 may indicate to the first node 506 that the second node 514 has taken over for the first node 506. Upon the first node 506 reaching a steady state of operation, the second node 514 may perform a giveback to return taken over objects back to the first node 506 so that the first node 506 can resume servicing client I/O. Accordingly, the second node 514 issues a release command 578 to release the lease 574 on the object (A) 522. Because the release command 578 is formatted according to the storage protocol, the driver 512 intercepts the release command 578 and translates the release command into a release object command 580 formatted according to the object store protocol. The driver 512 inserts the second lease identifier 518 into the release object command 580, and routes the release object command 580 to the object store 520 to remove the lease 574.

Figure 5H:
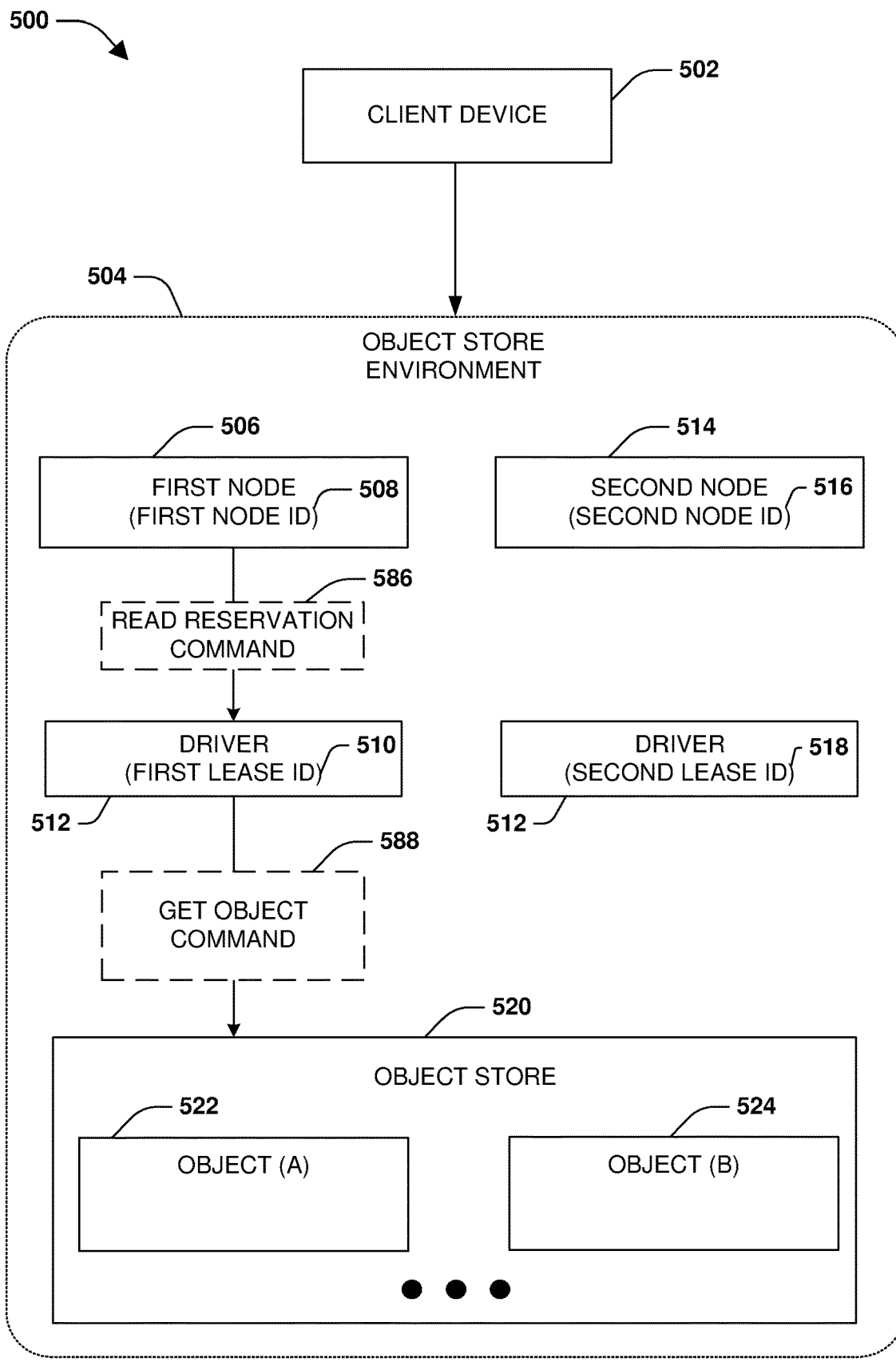
FIG. 5H is a block diagram illustrating an example system for lock reservations for shared storage, where a read reservation command is translated into a get object command.

FIG. 5H illustrates the first node 506 issuing a read reservation command 586 to determine whether there is still a lease on the object (A) 522 and/or other objects. The driver 512 may intercept the read reservation command 586 formatted according to the storage protocol. The driver 512 may translate the read reservation command 586 into a get object command 588 formatted according to the object store protocol, and transmit the get object command 588 to the object store 520. Because there is no lease on the object (A) 522, the driver 512 will return a response to the first node 506 that does not include any keys for the object (A) 522, thus indicating that the object store 520 provided an indication that there is no lease on the object (A) 522.

Figure 5I:
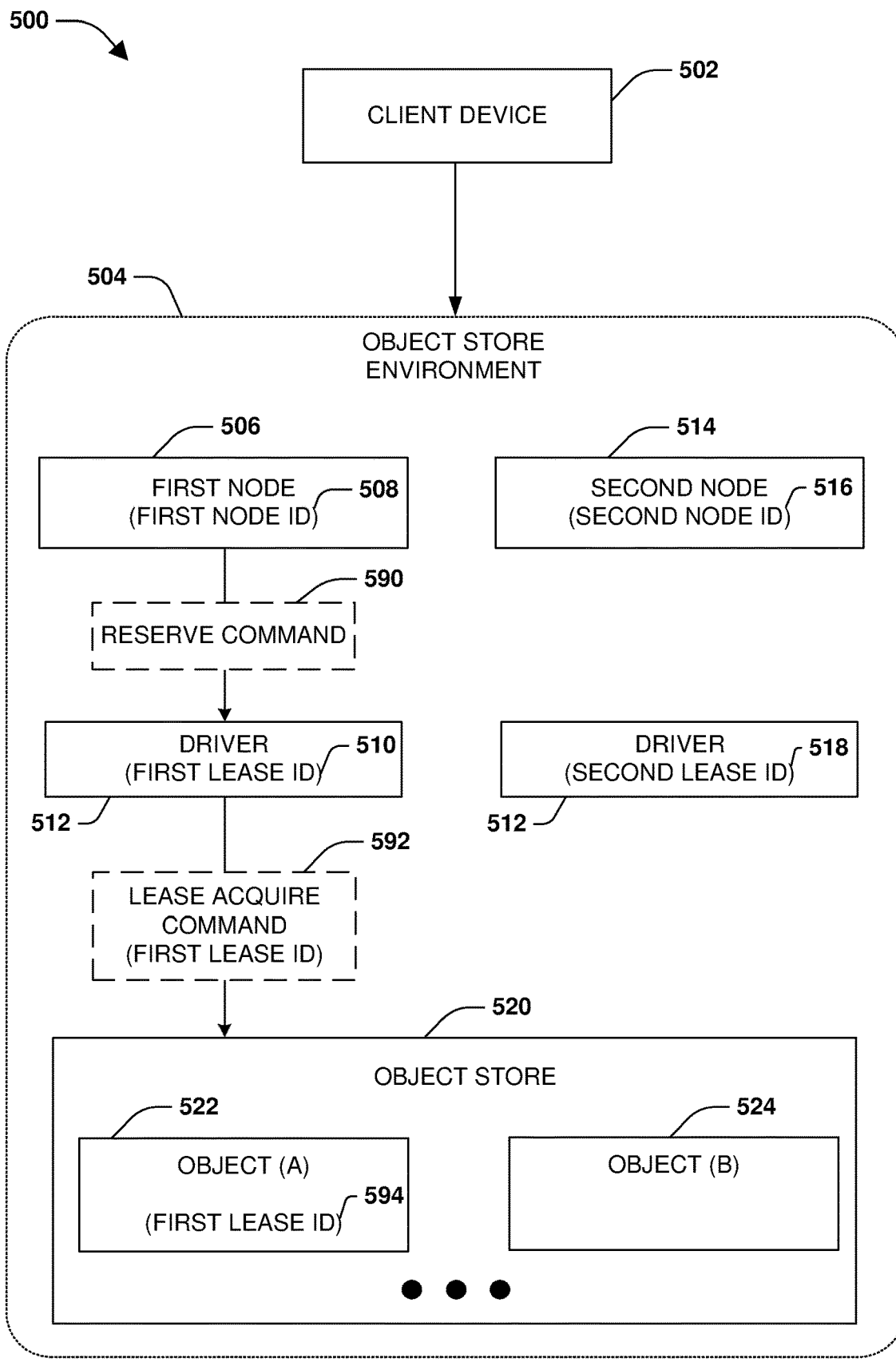
FIG. 5I is a block diagram illustrating an example system for lock reservations for shared storage, where a reserve command is translated into a lease acquire command.

FIG. 5I illustrates the first node 506 issuing a reserve command 590 to obtain a reservation on the object (A) 522 based upon the response to the read reservation command 586 indicating that there is no current lease on the object (A) 522. The driver 512 intercepts the reserve command 590 because the reserve command 590 is formatted according to the storage protocol. The driver 512 translates the reserve command 590 into a lease acquire command 592 formatted according to the object store protocol. The driver 512 inserts the first lease identifier 510 into the lease acquire command 592, and transmits the lease acquire command 592 to the object store 520. In this way, the first node 506 acquires a lease 594 on the object (A) 522 so that the first node 506 has exclusive write access to the object (A) 522 and no data corruption will occur from the second node 514 otherwise having write access to the object (A) 522.

Figure 6:
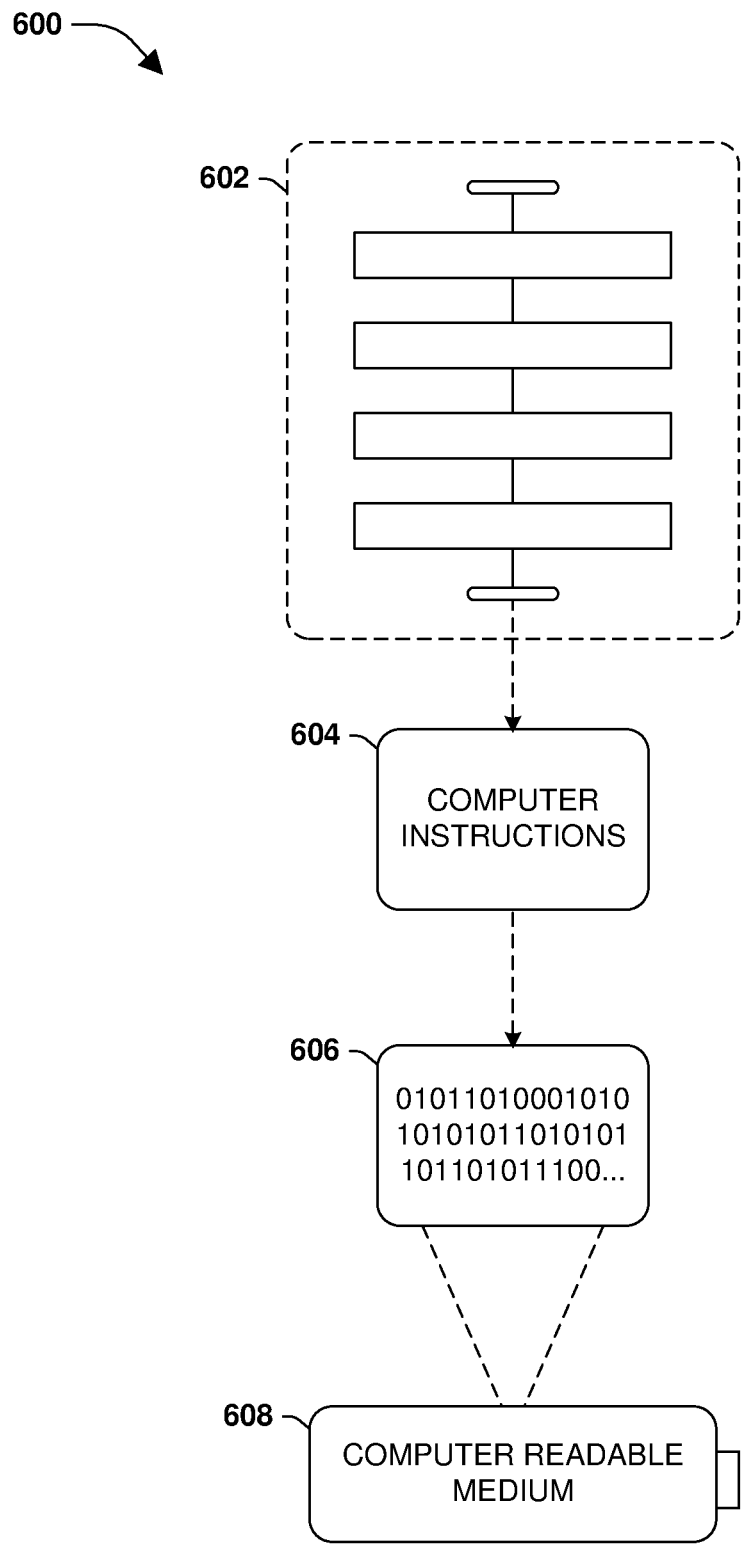
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5I, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method executed by one or more processors, comprising:
    translating a storage reserve command formatted according to a storage protocol to a first lease acquire command formatted according to an object store protocol, the storage reserve command generated by a first node to reserve a storage structure associated with an object of an object store of a cloud computing environment, wherein the object store supports the object store protocol without supporting the storage protocol, and the first lease acquire command includes a first lease identifier identifying the first node;
    transmitting the first lease acquire command to the object store to obtain a lease associated with the first lease identifier to grant the first node exclusive write access to the object and prevent a second node from writing to the object based on the lease being associated with the first lease identifier;
    in response to the first node becoming unavailable, translating a preempt command formatted according to the storage protocol to a change command formatted according to the object store protocol, the preempt command generated by the second node to change a reservation of the storage structure from the first node to the second node, wherein the change command includes the first lease identifier of the first node and a second lease identifier of the second node; and
    transmitting the change command to the object store to change the lease from being associated with the first lease identifier to being associated with the second lease identifier to grant the second node exclusive write access to the object and prevent the first node from writing to the object while the lease is associated with the second lease identifier.

2. The method of claim 1, wherein the storage reserve command is a SCSI (Small Computer Systems Interface) reserve command, and the storage structure is a volume.

3. The method of claim 1, further comprising:
    changing a state of the first node from an operational state to a passive state in response to the first node being operational during a failover operation, wherein the first node is blocked from writing to the object based upon successful execution of the change command.

4. The method of claim 1, further comprising:
    in response to the object store not having the lease, generating a second lease acquire command with the second lease identifier; and
    obtaining a new lease associated with the second lease identifier to grant the second node exclusive write access to the object and prevent the first node from writing to the object based on the new lease being associated with the second lease identifier.

5. The method of claim 1, further comprising:
    in response to the first lease identifier in the change command not matching a current lease identifier assigned to the object, generating a break lease command; and
    routing the break lease command to the object store to break the lease.

6. The method of claim 5, further comprising:
    in response to receiving an acknowledgment from the object store for the break lease command, generating a second lease acquire command with the second lease identifier; and
    obtaining a new lease associated with the second lease identifier to grant the second node exclusive write access to the object and prevent the first node from writing to the object based on the new lease being associated with the second lease identifier.

7. The method of claim 1, wherein a driver intercepts the storage reserve command.

8. A system comprising:
    a memory comprising instructions; and
    a processor coupled to the memory; the processor configured to execute the instructions to cause the processor to perform operations comprising:

translating a storage reserve command formatted according to a storage protocol to a first lease acquire command formatted according to an object store protocol, the storage reserve command generated by a first node to reserve a storage structure associated with an object of an object store of a cloud computing environment, wherein the object store supports the object store protocol without supporting the storage protocol, and the first lease acquire command includes a first lease identifier identifying the first node;

transmitting the first lease acquire command to the object store to obtain a lease associated with the first lease identifier to grant the first node exclusive write access to the object and prevent a second node from writing to the object based on the lease being associated with the first lease identifier;

in response to the first node becoming unavailable, translating a preempt command formatted according to the storage protocol to a change command formatted according to the object store protocol, the preempt command generated by the second node to change a reservation of the storage structure from the first node to the second node, wherein the change command includes the first lease identifier of the first node and a second lease identifier of the second node; and transmitting the change command to the object store to change the lease from being associated with the first lease identifier to being associated with the second lease identifier to grant the second node exclusive write access to the object and prevent the first node from writing to the object while the lease is associated with the second lease identifier.

9. The system of claim 8, wherein the storage reserve command is a SCSI (Small Computer Systems Interface) reserve command, and the storage structure is a volume.

10. The system of claim 8, the operations further comprising:

changing a state of the first node from an operational state to a passive state in response to the first node being operational during a failover operation, wherein the first node is blocked from writing to the object based upon successful execution of the change command.

11. The system of claim 8, the operations further comprising:

in response to the object store not having the lease, generating a second lease acquire command with the second lease identifier; and obtaining a new lease associated with the second lease identifier to grant the second node exclusive write access to the object and prevent the first node from writing to the object based on the new lease being associated with the second lease identifier.

12. The system of claim 8, the operations further comprising:

in response to the first lease identifier in the change command not matching a current lease identifier assigned to the object, generating a break lease command; and routing the break lease command to the object store to break the lease.

13. The system of claim 12, the operations further comprising:

in response to receiving an acknowledgment from the object store for the break lease command, generating a second lease acquire command with the second lease identifier; and obtaining a new lease associated with the second lease identifier to grant the second node exclusive write access to the object and prevent the first node from writing to the object based on the new lease being associated with the second lease identifier.

14. The system of claim 8, wherein a driver intercepts the storage reserve command.

15. A non-transitory machine-readable medium comprising instructions for performing a method, which when executed by a machine, causes the machine to perform operations comprising:

translating a storage reserve command formatted according to a storage protocol to a first lease acquire command formatted according to an object store protocol, the storage reserve command generated by a first node to reserve a storage structure associated with an object of an object store of a cloud computing environment, wherein the object store supports the object store protocol without supporting the storage protocol, and the first lease acquire command includes a first lease identifier identifying the first node;

transmitting the first lease acquire command to the object store to obtain a lease associated with the first lease identifier to grant the first node exclusive write access to the object and prevent a second node from writing to the object based on the lease being associated with the first lease identifier;

in response to the first node becoming unavailable, translating a preempt command formatted according to the storage protocol to a change command formatted according to the object store protocol, the preempt command generated by the second node to change a reservation of the storage structure from the first node to the second node, wherein the change command includes the first lease identifier of the first node and a second lease identifier of the second node; and transmitting the change command to the object store to change the lease from being associated with the first lease identifier to being associated with the second lease identifier to grant the second node exclusive write access to the object and prevent the first node from writing to the object while the lease is associated with the second lease identifier.

16. The non-transitory machine-readable medium of claim 15, wherein the storage reserve command is a SCSI (Small Computer Systems Interface) reserve command, and the storage structure is a volume.

17. The non-transitory machine-readable medium of claim 15, further comprising:

changing a state of the first node from an operational state to a passive state in response to the first node being operational during a failover operation, wherein the first node is blocked from writing to the object based upon successful execution of the change command.

18. The non-transitory machine-readable medium of claim 15, further comprising:

in response to the object store not having the lease, generating a second lease acquire command with the second lease identifier; and obtaining a new lease associated with the second lease identifier to grant the second node exclusive write access to the object and prevent the first node from writing to the object based on the new lease being associated with the second lease identifier.

19. The non-transitory machine-readable medium of claim 15, further comprising:
   in response to the first lease identifier in the change command not matching a current lease identifier assigned to the object, generating a break lease command; and
   routing the break lease command to the object store to break the lease.

20. The non-transitory machine-readable medium of claim 19, further comprising:
   in response to receiving an acknowledgment from the object store for the break lease command, generating a second lease acquire command with the second lease identifier; and
   obtaining a new lease associated with the second lease identifier to grant the second node exclusive write access to the object and prevent the first node from writing to the object based on the new lease being associated with the second lease identifier.

\* \* \* \* \*